No. 729,690. PATENTED JUNE 2, 1903.
A. P. SMYTHE & T. P. BRYANT.
MEANS FOR SECURING TOOLS TO HANDLES.
APPLICATION FILED OCT. 13, 1902.

NO MODEL.

Witnesses
Jas A. G. Koehl.

Inventors
A. P. Smythe and
T. P. Bryant.
By H. B. Willson & Co
Attorneys

THE NORRIS PETERS CO., PHOTO-LITHO., WASHINGTON, D. C.

No. 729,690. Patented June 2, 1903.

UNITED STATES PATENT OFFICE.

AMOS PIERCE SMYTHE, OF OLETHA, AND THOMAS P. BRYANT, OF KOSSE, TEXAS; SAID BRYANT ASSIGNOR TO SAID SMYTHE.

MEANS FOR SECURING TOOLS TO HANDLES.

SPECIFICATION forming part of Letters Patent No. 729,690, dated June 2, 1903.

Application filed October 13, 1902. Serial No. 127,162. (No model.)

*To all whom it may concern:*

Be it known that we, AMOS PIERCE SMYTHE, residing at Oletha, and THOMAS P. BRYANT, residing at Kosse, in the county of Limestone and State of Texas, citizens of the United States, have invented certain new and useful Improvements in Means for Securing Tools to Handles; and we do declare the following to be a full, clear, and exact description of the invention, such as will enable others skilled in the art to which it appertains to make and use the same.

This invention relates to certain new and useful improvements in axes, hatchets, hammers, and other tools, and particularly to means for preventing the tool from working off its handle.

The object of the invention is to provide simple and effective means for attaining this result; and to this end it consists in certain novel features of construction, combination, and arrangement of parts, as will be hereinafter more fully described, and particularly pointed out in the appended claim, reference being had to the accompanying drawings, in which—

Figure 1:
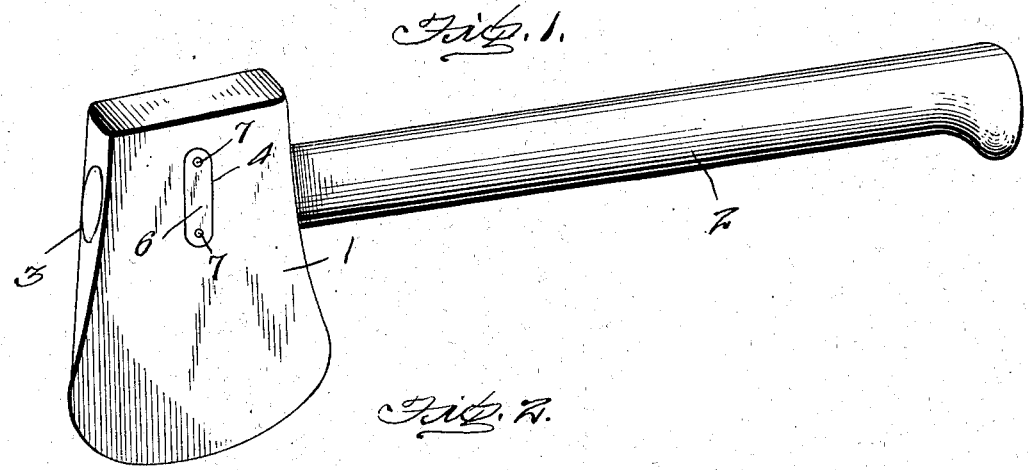
Figure 2:
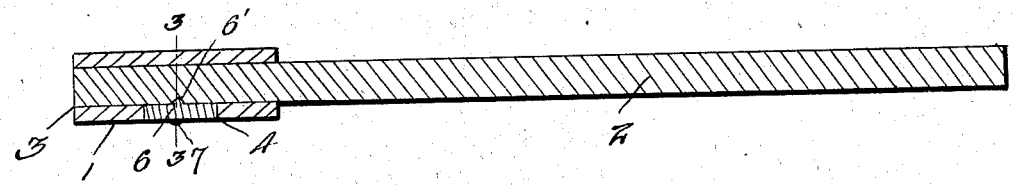
Figure 3:
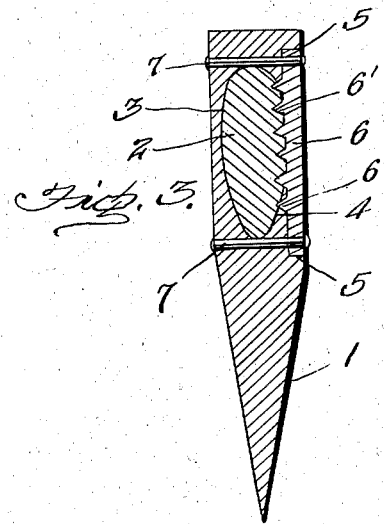
Figure 4:
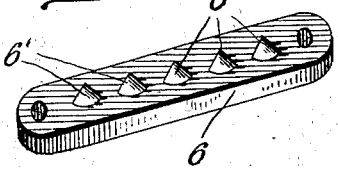

Figure 1 is a perspective view showing the application of the invention to an ax. Fig. 2 is a horizontal section of the same. Fig. 3 is a vertical section taken on line 3 3 of Fig. 2. Fig. 4 is a detail view of the spurred plate.

Referring now more particularly to the drawings, 1 denotes the tool, and 2 its handle, the former appearing in the present instance in the form of an ax-head, although the invention may be applied to hatchets, hammers, and other like tools. The present specific illustration is simply to show the application of the invention.

The eye 3 of the tool is formed in one of its sides with an opening 4, which is made slightly longer than the eye to provide end seats or shoulders 5. Inserted in this opening is a plate 6, which rests upon said seats or shoulders and is provided upon its inner face with spurs or projections 6' to enter the handle 2. The plate and opposite side of the eye are apertured for passage of rivets 7, which hold the plate in place in the opening 4 and graze the handle 2 at top and bottom, thereby assisting in holding the tool on the handle. After the end of the handle has been inserted in the eye 3 the plate 6 is applied and the spurs forced into the side of the handle 2, and then the rivets are applied to hold the plate in place. The spurs will then prevent the tool from working off the handle.

It will be noted that the spurs sink into the handle but a short distance and while preventing displacement of the tool do not interfere with the insertion of the ordinary wedge.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described our invention, what we claim as new, and desire to secure by Letters Patent, is—

The combination with a tool-handle, of a tool having an eye receiving the handle, said eye having integral sides, one of which is provided with a central longitudinal opening of a depth corresponding substantially to the depth of the socket, a plate seated in said opening and provided with spurs and engaging the handle, and fastenings passing transversely through the eye and holding the plate seated in said opening, substantially as described.

In testimony whereof we have hereunto set our hands in presence of two subscribing witnesses.

AMOS PIERCE SMYTHE.
THOMAS P. BRYANT.

Witnesses:
A. J. HODGES,
J. R. BRYANT.